Patented Dec. 30, 1930

1,787,239

UNITED STATES PATENT OFFICE

HANNS FLEISCHMANN, OF LUDWIGSHAFEN-ON-THE-RHINE, AND OTTO JORDAN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF INTAGLIO PRINTING COLORS

No Drawing. Application filed March 13, 1929, Serial No. 346,797, and in Germany March 15, 1928.

The present invention relates to the production of intaglio printing colors.

We have found that very valuable intaglio printing colors can be prepared by incorporating coloring materials in a finely dispersed, e. g. in a sufficiently finely divided or dissolved state, with solutions of resinous products obtained from urea, or derivatives of the same, and aldehydes, in particular formaldehyde, or from organic vinyl esters such as vinyl acetate, or from dibasic organic acids and polyhydric alcohols, which solutions are prepared with the employment of volatile organic solvents.

The preparation of the intaglio printing colors is preferably carried out by dissolving the said resinous products in volatile organic solvents, or mixtures of such solvents, and then incorporating soluble or insoluble organic or inorganic coloring materials, with the solutions. The solutions of the said resinous products may be readily prepared; for this purpose the finished resinous product may be treated with the solvent, or solvent mixture, or the production of the resinous products may be carried out in the presence of large quantities of a solvent, or of a solvent mixture, so that the finished product is at once obtained in the dissolved form.

The resinous products obtained from urea, or thiourea, and aldehydes, or other urea derivatives, such as methylol ureas, or from organic vinyl esters, or from dibasic acids and polyhydric alcohols, are soluble in a great number of volatile organic solvents, especially those which contain hydroxyl groups, as, for example, aliphatic alcohols which contain from 1 to 5 carbon atoms, glycol monoalkyl ethers or ketones, and, depending on their nature also in esters or in hydrocarbons of the benzene series and the like, but easily soluble in mixtures of these substances with each other or with other substances of resinous or oily character. When selecting the solvent, or solvent mixture, it is preferable to choose mainly solvents having but a slight odor, such as alcohols, and in this manner obnoxious odors are avoided when utilizing the intaglio printing colors; it is also advantageous in all cases to restrict the danger of fire by choice of solvents which are as difficultly inflammable as possible, or of solvents the vapors of which form explosive mixtures with air within the narrowest possible limits of composition. By incorporating coloring materials, in particular insoluble organic or inorganic coloring materials, with the said solutions in a suitable manner, for example, with the aid of a three-roller mill, products are obtained which directly or after dilution, give excellent results in intaglio printing.

The said intaglio printing colors print very well, and they do not completely penetrate the papers employed for the intaglio printing. The finished prints have a good fastness to water and rubbing. Since by the employment of these printing colors, the employment of solvents with a strong odor, as, for example, xylene, which is usually employed in ordinary intaglio printing colors, can be wholly avoided by employing mainly solvents having but a slight odor, in particular alcohols, in their place, the annoyances from the odor of intaglio printing colors containing hydrocarbons of the benzene series, which annoyances are occasionally pronounced, can be dispensed with.

In addition to, or in place of, the insoluble organic or inorganic coloring materials, soluble coloring materials may also frequently be employed. Moreover, it is possible to incorporate several of the resinous products hereinbefore described simultaneously, or to incorporate, in addition to one or more of the said resinous products, substances of a resinous character, such as natural resins, or other resinous products, such as cumarone resins, colophony and the like, and also cellulose derivatives, as for example nitro or acetyl cellulose or other cellulose esters or ethers, or suitable oleaginous substances, or mixtures of the same. Thus it is possible to vary the consistency, adhesive action, duration of drying, lustre, content of solid material and the like of the products within the widest limits. When resinous condensation products of a urea and an aldehyde are employed some water may also be incorporated with the mixtures.

The following examples will further illustrate how the said invention may be carried into practical effect, but the invention is not restricted to these examples. The parts are by weight.

*Example 1*

A solution of 40 parts of a condensation product of urea and formaldehyde, 40 parts of isobutyl alcohol and 20 parts of 80 per cent ethyl alcohol is mixed with 10 parts of lampblack and 5 parts of the calcium salt of the azo dyestuff of aniline and 2.6-naphthol sulphonic acid, and the mixture is repeatedly finely ground in a three-roller mill, if necessary with the addition of a little alcohol. After dilution with alcohol an intaglio printing color ready for printing and having valuable properties is obtained.

*Example 2*

50 parts of a resinous product obtainable by the polymerisation of vinyl acetate are dissolved, if necessary while warming, in a mixture of about 10 parts of cyclohexanone, 10 parts of ethyl acetate and 30 parts of ethyl alcohol. 7.5 parts of lampblack and 2.5 parts of the calcium salt of the azo dyestuff of aniline and 2.6-naphthol sulphonic acid are then added and the mixture is allowed to pass several times through a three-roller mill, if necessary with the addition of alcohol. By dilution with the before-described solvent mixture, or with alcohol and the like, an intaglio printing color ready for printing and having valuable properties is obtained. If desired, a small quantity of cumarone resin and/or of a nitrocellulose containing, preferably, less than 11 per cent of nitrogen, can be added.

*Example 3*

50 parts of a soluble resin obtained from phthalic acid and glycerol are dissolved in 40 parts of ethyl alcohol and 10 parts of glycol monoethyl ether, and a mixture of 10 parts of lampblack and 5 parts of the azo dyestuff of 2-naphthylamine-1-sulphonic acid and β-naphthol is then added and the mixture is then allowed to pass several times through a three-roller mill, if necessary with the addition of a little alcohol. By dilution with alcohol an intaglio printing color ready for printing and having valuable properties is obtained. If desired, a small quantity of a vegetable oil, such as castor oil may be added.

What we claim is:—

1. Intaglio printing colors comprising a finely dispersed coloring material and a solution, in a volatile organic solvent, of a resinous product selected from the group consisting of condensation products of a urea with an aldehyde, of organic vinyl esters, and of dibasic organic acids with polyhydric alcohols.

2. Intaglio printing colors comprising a finely dispersed coloring material and a solution, in a volatile organic solvent, of a resinous condensation product of a urea with an aldehyde.

3. Intaglio printing colors comprising a finely dispersed coloring material and a solution, in a volatile organic solvent, of a resinous condensation product of urea and formaldehyde.

4. Intaglio printing colors comprising a finely dispersed coloring material, a solution, in a volatile organic solvent, of a resinous condensation product of urea and formaldehyde and a small quantity of water.

In testimony whereof we have hereunto set our hands.

HANNS FLEISCHMANN.
OTTO JORDAN.